Oct. 20, 1970    H. R. POWELL ET AL    3,534,849
SWITCH-BACK CONVEYOR

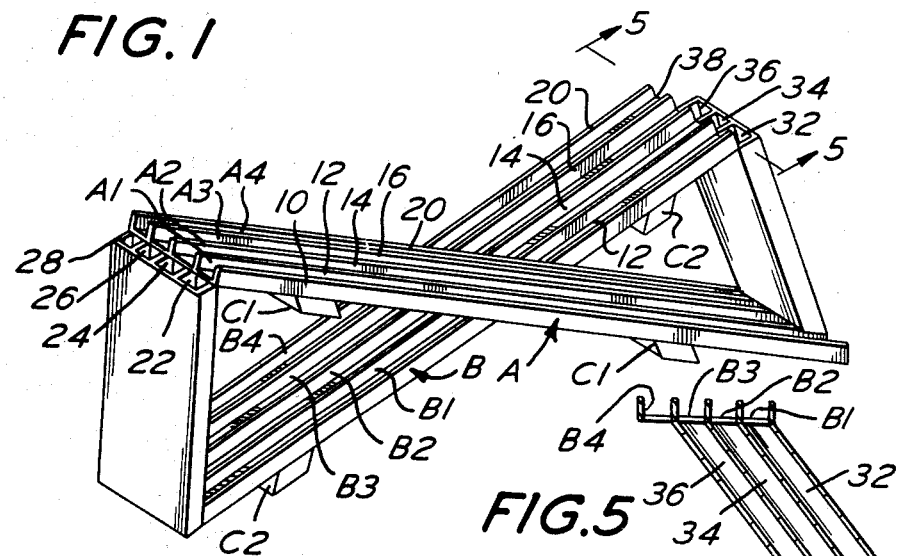
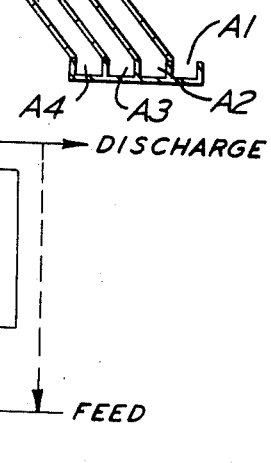
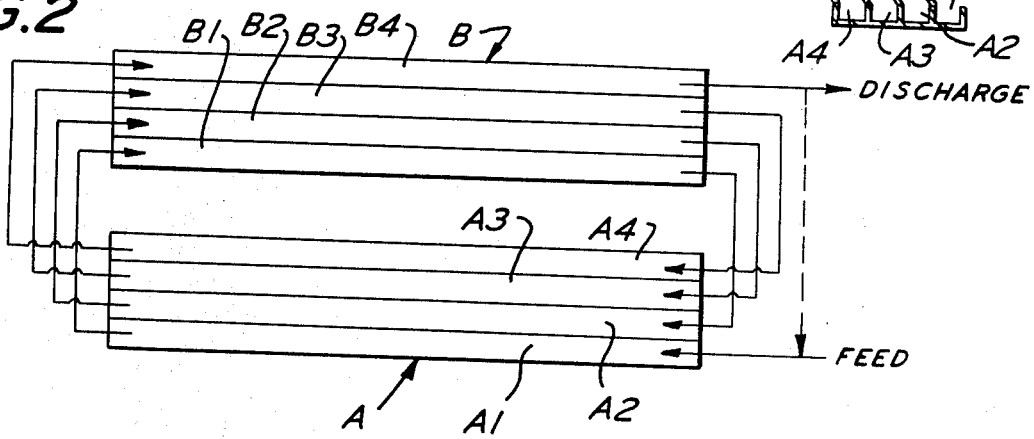
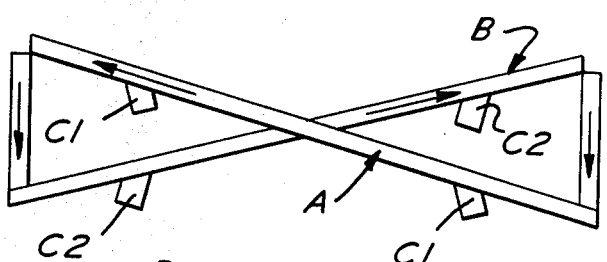
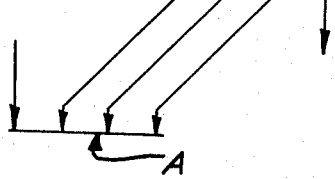

Filed March 21, 1968

INVENTORS.
HAROLD R. POWELL
JOHN H. DeCOURSEY, JR.
BY
Stanley Biller
ATTORNEY

United States Patent Office 3,534,849
Patented Oct. 20, 1970

3,534,849
SWITCH-BACK CONVEYOR
Harold Richard Powell, King of Prussia, and John Herman De Coursey, Jr., Richboro, Pa., assignors to Pennwalt Corporation, Philadelphia, Pa., a corporation of Pennsylvania
Filed Mar. 21, 1968, Ser. No. 714,873
Int. Cl. B65g 27/34
U.S. Cl. 198—220                4 Claims

ABSTRACT OF THE DISCLOSURE

Material treatment apparatus comprising at least two side-by-side upwardly inclined vibratory conveyors arranged in switch-back configuration. Each conveyor has longitudinally-extending channels with chutes at the upper end of the channels in one conveyor discharging into the bottoms of the channels in the other conveyor so as to advance particulate material in oppositely directed parallel paths. This permits prolongation of the treatment period in minimal floor space while particle movement is always in a predetermined direction without random motion.

BACKGROUND OF INVENTION

This invention relates to conveyors and more particularly relates to vibratory conveying systems for effecting material treatment, such as by heating, cooling, drying, classifying, etc., whil the material is in motion. This invention is especially concerned with a conveying system which will extend the exposure of treatment of the particulate material being conveyed over a prolonged period of time within a minimum of space but while inspiring continuous advancement of the material in a constant predetermined direction without retrogression or random movement.

In the processing of particulate material, it is frequently desirable and necessary to convey the material through the treatment zone while subjecting it to a vibration action. This treatment can consist of exposure to heat and vacuum, for example, in order to effect drying thereof. Sometimes, the exposure to the treatment can be for extended periods of time, hours or even days, and during this treatment period each particle of material should be exposed for the same length of time to provide uniformity of the batch. Where the amount of space to perform the treatment is limited, and optimum use of floor is a necessary concomitant of economy, the apparatus for conveying the material must be collapsed into a small area. However, by diminishing the length of the conveying system, it has been heretofore necessary to reduce the speed of conveyance. Since the feed rate or migration of a given material being vibrationally conveyed reaches a lower limit below which the individual particles migrate in a haphazard and random fashion, this reduction in speed causes the predictable feed rate in a given direction to become unreliable. When the desired continuous feed rate of the material falls below the critical lower limit, it has been necessary in the past to interrupt or cycle the feed mechanism. Otherwise, there would be non-uniformity in the material being processed.

It is therefore an object of this invention to provide a material treatment vibration conveying apparatus which will occupy minimal floor space and guarantee advancement of all particles in a predetermined direction for prolonged extended periods of time.

Another object of this invention is to provide a material treatment conveying apparatus in which there will be adequate conveyor length to accommodate the parameters of minimum feed rate and required residence treatment time.

Still another object of this invention is to provide a material treatment vibratory conveyor apparatus in which recycling can occur without interrupting the feed mechanism.

Yet another object of this invention is to provide a material treatment conveying apparatus in which the number of conveyor frames and drive mechanisms is reduced to a minimum.

Yet still a further object of this invention is to provide a compact material treatment conveying apparatus in which means are incorporated to vary angle of inclination and feed rate continuously.

Other objects of this invention are to provide an improved device of the character described which is easily and economically produced, which is sturdy in construction and highly efficient and effective in operation.

DESCRIPTION OF THE FIGURES

With the above and related objects in view, the invention consists of the details of construction and combination of parts as will be more fully understood from the following detailed description when read in conjunction with the accompanying drawings, in which:

FIG. 1 is a perspective view of a material treatment conveying apparatus embodying this invention.

FIG. 2 is a diagrammatic plan view of the flow path in the carrier members.

FIG. 3 is a side view of the conveying apparatus.

FIG. 4 is a diagrammatic end view showing the flow path.

FIG. 5 is a sectional view taken along lines 5—5 of FIG. 1.

DETAILED DESCRIPTION

Figure 6:
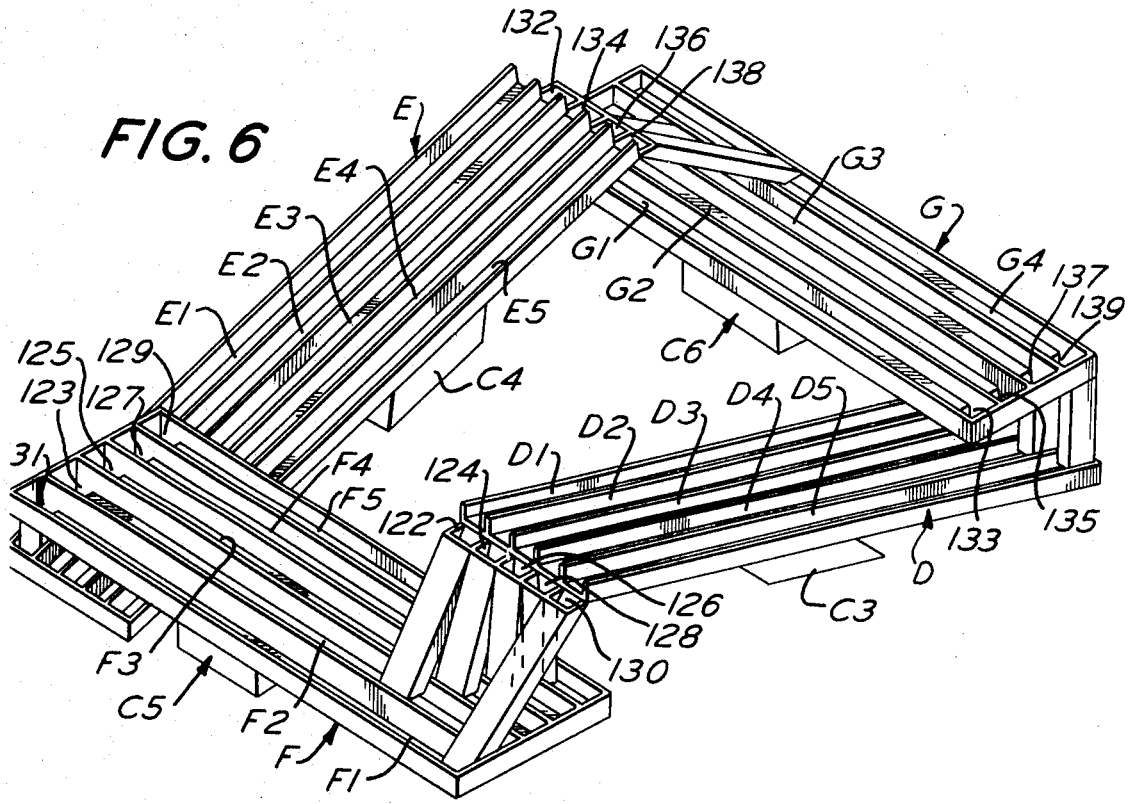
FIG. 6 is a perspective view of another embodiment of the conveying apparatus.

Referring now in greater detail to the drawings in which similar reference characters refer to similar parts, we show a material treatment conveying apparatus comprising at least a pair of upwardly-inclined carrier members, generally designated as A and B respectively. The two carrier members A and B are arranged in side-by-side disposition so that the upepr end of carrier member A is adjacent the lower end of carrier member B. Vibratory elements C1 are coupled to the carrier member A in order to impart vibratory motion thereto to advance the particulate material to be treated in a forward direction up the inclined surface. Similarly vibratory elements C2 are coupled to the carrier B so as to vibratorily advance the particulate material upwardly along the inclined surface. The vibratory elements C1 and C2 may be any suitable electro-magnetic or eccentric mass system for imparting oscillatory motion at various amplitudes and speeds.

Each of the carriers A and B is divided into a plurality of longitudinally extending channels A1, A2, A3, A4, and B1, B2, B3, and B4 by a plurality of laterally spaced rails 12, 14, and 16 intermediate side walls or flanges 10 and 20 at the upper end of the carrier A. A chute 22 delivers the contents of channel A1 as they arrive thereat and drops them to the bottom of channel B1; chute 24 discharges its particulate material from channel A2 to the lower end of Channel B2; chute 26 discharges the material flowing up channel A3 to the inlet portion of channel B3; and channel A4 discharges through chute 28 to channel B4. In a similar manner the material received from carrier A advances up the incline of carrier B. Channel B1 discharges at its upper end to chute 32 which empties into channel A2; channel B2 delivers its contents to chute 34 which discharges to the bottom end of channel A3; A3 delivers to chute 26 which discharges to B3; channel B3 discharges to chute 36 which delivers to channel A4; and channel A4 delivers to chute 28 which discharges to channel B4. Chute 38 which is coupled to the upper end of channel B4 either discharges to a subsequent operation or is returned to the inlet feed end of channel A1 to recycle the treatment of the material as desired. It is, of course, possible to feed the discharge end of carrier member B to still another parallel conveyor line, but the instant invention basically involves just a pair of parallel carrier members for making optimum use of floor space.

Longitudinal compartmentalization can be effected into as many longitudinal channels as desired which will of course increase the number of flow passages. The number of flow passages will be dictated by the critical flow velocity of the material and the necessary retention or residence time in a given space restriction. By directing the particulate material to flow in one direction in the first channel A1, then directing the flow to channel B1 of the directionally opposed carrier B, and thence to channel A2, etc. it may easily be seen that the effective length of the combined flow path is substantially increased with minimum consumption of floor space. Furthermore, the number of conveyor carrier units and/or drive mechanism, such as vibratory motors, is reduced to a minimum.

Inasmuch as the two carrier units A and B are directionally opposed, it is necessary to isolate the vibrational forces from one to the other. Accordingly, the chutes leading from one to the other must either be in spaced relationship at the discharge or feeding ends thereof, or some flexible coupling arrangement must be afforded to provide vibration isolation. It is also possible to utilize resilient ducts of rubber or accordion sections for the entire chutes themselves, only limited by the nature of the material being treated or the characteristics of treatment.

Finally, it is possible to adjust the rate of flow by varying the angle of longitudinal inclination of the carrier members. Where the inclination from horizontal is small, this invention also contemplates transfers from the discharge of one conveyor to the receiving end of the other by mechanical transfer, such as intermediate conveyors rather than solely by the gravity discharge chutes herein described.

Figure 7:
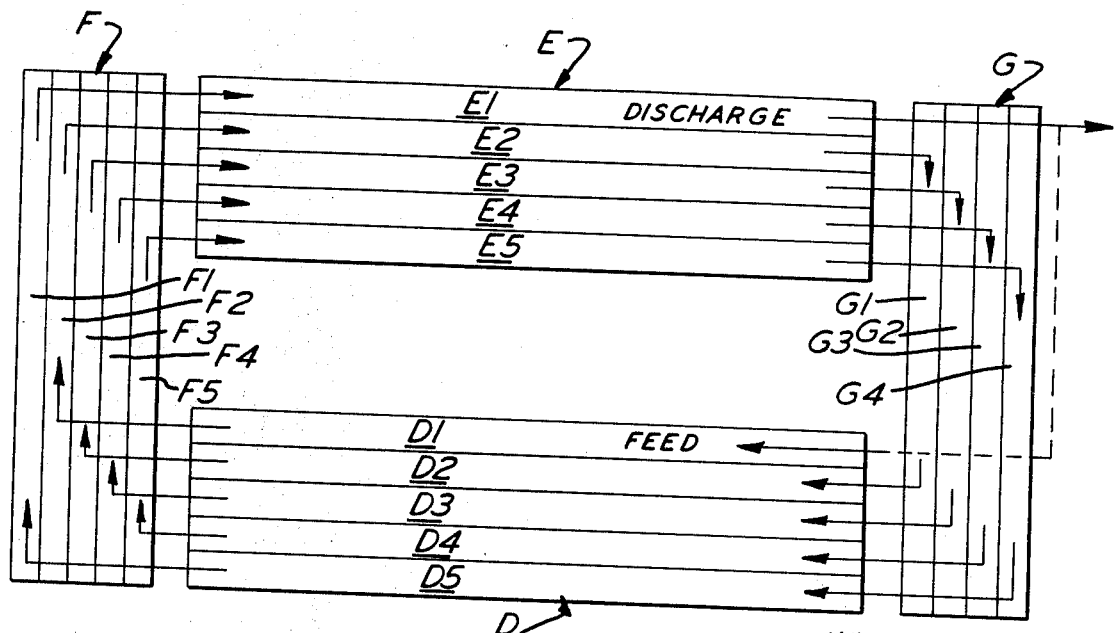
FIG. 7 is a diagrammatic plan view of the flow path for the embodiment of FIG. 6.

In FIGS. 6 and 7 there is shown a pair of upwardly inclined conveyors D and E which are oriented in parallel but spaced disposition with respect to each other. Vibrator element C3 causes the material particles to advance upwardly in a predetermined direction on conveyor D while vibrator element C4 performs the same advancement with respect to conveyor E. Since the degree of incline of the conveyors with respect to the horizontal may be too small to permit gravity feed from one conveyor to the other, intermediate horizontal conveyors F and G are employed. That is, the fall from the chutes of the inclined conveyors is substantially vertical, and the intermediate conveyors handle the horizontal transportation. The elements C5 and C6 are used to designate any horizontal mode of travel, either continuous belt, screen conveyors, piston, vibrator or other conventional conveyor drives.

D1 delivers to chute 122 which discharges to channel F2 in transverse conveyor F. Channel F2 carries the material horizontal to chute 123 which discharges to channel E2. Channel E2 carries the material upwardly where it is discharged into chute 132. Chute 132 drops the material into horizontal conveyor G1 which carries the material to chute 133 which drops it into the bottom of channel D2. D2 raises the material to chute 124 for discharge into horizontal conveying channel F3. Correspondingly, F3 delivers to chute 125 which discharges into the bottom of channel E3. Channel E3 carries the material upwardly for discharge through chute 134 into horizontal conveyor channel G2. Channel G2 discharges through chute 135 into bottom of channel D3. Channel D3 transports material upwardly to chute 126 for discharge into horizontal channel F4. F4 delivers to chute 127 for discharge into channel E4. Channel E4 raises to chute 136 for dumping into horizontal channel G3. Channel G3 delivers to chute 137 and discharges it into channel D4. D4 channel elevates to chute 128 for discharge into horizontal conveyor F5. Horizontal channel F5 carries the material to chute 129 which discharges into channel E5. E5 delivers to chute 138 for discharge into horizontal channel G4. Channel G4 carries the material to chute 139 which drops the material into bottom of channel D5. Channel D5 raises the material to chute 130 for dumping into horizontal channel F1 whereupon F1 delivers to chute 131 for dumping into bottom of discharge channel F1. Of course, channel E1 can return the material back to conveyor G for recycling, as indicated by broken line in FIG. 7.

It is also apparent that the carrier members may be placed in vacuum chambers to facilitate drying, and/or the carriers may be placed under radiant heaters or in ovens or freezers or the like in order to effect the desired material treatment. In any event, the present invention enables the feed or migration rate of a given material being vibrationally conveyed to reach the lowest possible limit below which the individual particles will move in a random or haphazard manner. Hence, the feed rate may be extended as desired and is reliably predictable in a given direction with great accuracy so as to permit precision material treatment.

What is claimed is:

1. Material treatment conveying apparatus comprising at least two longitudinally-extending substantially straight carrier members constituting respective stationary conduits arranged in side-by-side substantially parallel disposition and upwardly inclined in opposite directions with respect to each other, each of said carrier members including a plurality of longitudinally-extending channels therein, means for vibrating said carrier members to advance particulate material in only an upward and advancing direction at a predetermined speed, and means for discharging the particulate material arriving at the upper portion of one carrier member into the bottom portion of the other carrier, said means for discharging constituting chutes at the upper ends of the channels in communication with the lower ends of respective channels in the other carrier member, and the chutes of one carrier member being coupled to the next successive channels of the other carrier member.

2. The apparatus of claim 1 including means to feed the particulate material into a receiving channel in one carrier member.

3. The apparatus of claim 2 including means to dump fully treated material from an outlet channel in one carrier member.

4. The apparatus of claim 1 wherein said chutes in one carrier member are vibrationally isolated from the other carrier member.

References Cited

UNITED STATES PATENTS

| 1,416,763 | 5/1922 | Thom | 198—45 X |
| 1,684,853 | 9/1928 | White | 198—85 X |
| 2,134,452 | 10/1938 | Moore | 198—220 |
| 3,227,263 | 1/1966 | Kastenbein | 198—220 |

GERALD M. FORLENZA, Primary Examiner

G. F. ABRAHAM, Assistant Examiner

U.S. Cl. X.R.

198—85